United States Patent [19]
Eleftheriou

[11] Patent Number: 5,869,826
[45] Date of Patent: Feb. 9, 1999

[54] SYSTEM AND METHOD FOR CONDUCTING COINLESS TRANSACTIONS

[76] Inventor: Lefteris Eleftheriou, 2418 Canyon Dr., Ypsilanti, Mich. 48197

[21] Appl. No.: 884,984

[22] Filed: Jun. 30, 1997

[51] Int. Cl.[6] .................................................. G06K 5/00
[52] U.S. Cl. ........................... 235/380; 235/379; 235/381
[58] Field of Search .................................... 235/379, 380, 235/381

[56] References Cited

U.S. PATENT DOCUMENTS

| | | | |
|---|---|---|---|
| 4,120,452 | 10/1978 | Kimura et al. ........................... | 235/381 |
| 4,764,666 | 8/1988 | Bergeron ................................. | 235/381 |
| 5,371,345 | 12/1994 | LeStrange et al. ...................... | 235/380 |
| 5,440,108 | 8/1995 | Tran et al. ............................... | 235/381 |
| 5,450,938 | 9/1995 | Rademacher ............................ | 194/206 |
| 5,491,326 | 2/1996 | Marceau et al. ......................... | 235/381 |
| 5,604,343 | 2/1997 | Curry et al. ............................. | 235/492 |

OTHER PUBLICATIONS

William G. Flanagan and Alexandra Alger, "It's Found Money", Forbes, Feb. 10, 1997 at pp. 214, 216.

*Primary Examiner*—Harold Pitts
*Attorney, Agent, or Firm*—Steptoe & Johnson

[57] ABSTRACT

In a commercial transaction system, a magnetic stripe data card is used to interact with a point of sale (POS) terminal, equipped with a card reader/writer device, a computer system, and a display device, and an input means for entering cost information, to conduct coinless transactions with cash or paper bill currency. The POS terminal is capable of processing data which includes comparing the fractional transaction cost of the goods and/or services to be purchased with an existing balance of change stored on the magnetic stripe data card, and updating the balance of change at the end of the transaction. In a preferred embodiment of the present invention, when the balance of change associated with the card does not cover the fractional dollar cost of the transaction, the system provides a change renewal algorithm which automatically increases the balance on the card by an amount equal to the difference between the cost of the transaction and the next highest whole dollar amount. This difference is also added to the transaction cost raising it to the next highest whole dollar amount. Likewise, when the balance of change stored on the card does cover the fractional dollar cost of the transaction, the system provides a change depletion algorithm which automatically decreases the balance on the card by an amount equal to the fractional dollar cost of the transaction. This amount is also deducted from the transaction cost lowering it to the next lowest whole dollar amount. In either case, whether the balance of change stored on the card is greater than, or less than or equal to, the fractional dollar cost of the transaction, the fractional dollar cost of the transaction, or the difference between 1.0 and the fractional dollar cost of the transaction, is automatically debited from or credited to both the balance on the card and the total cost of the transaction, respectively, thereby resulting in a whole dollar cost for the transaction. The lack of any fractional cost for the transaction eliminates the requirement to exchange coins of any denomination while conducting commercial transactions with cash or paper bill currency.

23 Claims, 3 Drawing Sheets

SYSTEM AND METHOD FOR CONDUCTING COINLESS TRANSACTIONS

BACKGROUND OF THE INVENTION

1. Field of Invention

This invention relates to a commercial transaction system and method, and more specifically, to a system and method for conducting cash-payment transactions without the use of coins.

2. Related Art

Presently, there are billions of dollars worth of coins, or change, estimated to be lying around and not being used. Spare coins end up in jars or dresser drawers, get lost, or are simply thrown away. The reason change accumulates is that a person must physically carry coins to conduct day-to-day transactions. These transactions include buying goods and/or services from supermarket cashiers, vending machines, parking meters, laundry machines, toll machines, photocopiers, and the like. Although there are several methods in the art which specifically eliminate the use of both paper currency and coins (cash), such as credit cards, debit cards, pre-valued vending cards, and more recently, integrated circuit (IC) cards, none of these methods attempt to eliminate the use of coins with paper currency transactions at the point of sale.

Credit and debit card systems are examples of cashless transactions where a financial institution extends credit or debit to a cardholder to cover purchases from participating merchants. In a credit card system, a financial institution pays the merchant the purchase price less a service charge fee and later bills the cardholder for the purchase price. In contrast, with a debit card system, a financial institution directly deducts the purchase price from the cardholder's bank account. In either case, it is necessary for a financial institution, e.g., a bank, to mediate the transaction. Typically, these transactions need to be attended by a salesperson who calls a processing center via a dial-up modem to obtain authorization, and verifies the cardholder's signature to prevent fraud. This involves significant transaction costs which may be acceptable for large purchases, but is not cost effective for relatively small purchases. In addition, access to financial institutions by telephone lines can lead to security problems, and to an inability to transfer transaction data in the case of a communications link failure. These techniques are also open to human error, and moreover require a large number of steps in collecting and processing the data.

Further examples of cashless transactions involve the use of pre-valued vending cards or integrated circuit (IC) cards. A subway system such as the Washington D.C. Metro system utilizes such pre-valued vending cards. A certain amount of money or cash value is purchased and stored on the card, and subsequently used to purchase goods and services. Each time a purchase is made, the card is debited for the cost of that item. Payment by this pre-valued method, however, entails that the purchaser go to a different specified location to increase the balance on the card with additional money. With IC cards, value must also be loaded at a separate terminal which is typically in communication with one or more financial entities having access to the designated account of the cardholder for authorization of the transfer of value to the IC card. Therefore, a disadvantage of pre-valued vending cards and IC cards is the need to find a separate terminal from which to add value to a card.

Another disadvantage is that conventional pre-valued vending cards can only be used in a closed system, and cannot be utilized by the card user outside the system to freely spend his pre-paid amount. Also, the cards are used until exhausted and then discarded, which contributes to excess environmental waste. In contrast, conventional IC cards have the advantage of being re-valued once their balance is depleted, but like credit and debit cards, added security measures must be taken, and complicated encryption codes must be incorporated into the transaction process to prevent unauthorized or fraudulent access to a cardholder's account. Again, this involves significant transaction costs.

Due to the aforementioned disadvantages of conventional methods for conducting cashless commercial transactions, consumers must still rely heavily on the use of cash, particularly in conducting transactions of relatively small monetary value. As a result, it is necessary to either manually or automatically exchange coins during cash transactions, and this requires that an inventory of coins be kept on hand. Individual cash transactions are burdened by this need to provide and manage coins. It is inconvenient, costly, and time consuming for customers, clerks, and financial institutions alike. The growing popularity of coin-handling and coin-sorting devices is further evidence of the present need to relieve this burden.

Therefore, there is a need for a convenient, cost-effective, open system for eliminating the need to exchange coins with commercial cash transactions at the point of sale. Further, there is a need for a system and method for conducting cash-payment transactions without the use of coins and without requiring a user to access a separate terminal for managing a balance on a storage device.

Summary of the Invention

The present invention solves the problem of eliminating the use of coins for a commercial cash transaction by using a storage device such as a magnetic stripe data card, which is capable of storing a value amount of coins in the form of electronic data, and point of sale (POS) terminals, such as electronic cash registers and vending machines located at the place where commercial sale transactions take place. A POS terminal has a card reader and writer device and a computer system for accepting the storage device, reading a change balance on the storage device, comparing the change balance with a transaction cost amount, and calculating and writing a new change balance back to the storage device. In the present invention, the storage device is used in place of coins and maintains a balance between $0.00 and $0.99 cents. The storage device is capable of interfacing with a POS terminal for the transfer and storage of data in the form of electronic change to eliminate the exchange of coins of any denomination with cash-payment purchases at the point of sale.

In making a cash transaction for the purchase of goods and services, a cashier enters the total cost of a commercial transaction into a POS terminal. A cardholder then inserts his magnetic stripe data card, change card, into the POS terminal. The POS terminal determines whether the fractional value of the total cost is greater than the change balance on the change card. If the fractional value is greater than the change balance, the POS terminal rounds the total cost up to the next whole dollar amount, the new total cost. After the cardholder pays the new total cost, the POS terminal increases the change balance on the change card with a renewal amount equal to one minus the fractional value. If the fractional value is not greater than the change balance, the POS terminal subtracts the fraction value from the total cost and generates a new total cost that is rounded down to the whole dollar amount. After the cardholder pays the new total cost, the POS terminal updates the change balance on the change card by subtracting the fractional value from the change balance. Therefore, with the present invention, the cardholder always pays a whole dollar amount while maintaining a change balance on the change card.

One advantage of the present invention is that it obviates the need to provide change during a transaction process, thereby eliminating the subsequent handling (receiving, transferring, sorting, counting, storing, and delivering) of coins. Another advantage of the present invention is that it obviates the need to have financial institutions mediate the transaction, thereby eliminating the need to prevent fraudulent access to a user's bank account. A further advantage is that the present invention automatically re-values the balance on a user's magnetic stripe data card at the point of sale, thereby eliminating the need to re-value it with additional money at a separate location. Still further advantages will become apparent from a consideration of the ensuing description and drawings.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

DEFINITION OF VARIABLES IN DRAWINGS

CB Change Balance: balance of change (number of cents) or fractional dollar value stored on magnetic stripe data card (in the preferred embodiment: $\$0.00 \leq CB \leq \$0.99$);

TC Transaction Cost: total dollar cost of commercial transaction;

F Fractional value of transaction cost: fractional dollar cost (number of cents) of total dollar cost of commercial transaction. For example, if TC=$2.55, then F=$0.55 (in the preferred embodiment: $\$0.00 \leq F \leq \$0.99$);

NTC New Transaction Cost: fractionless (whole dollar) transaction cost; and

NCB New Change Balance: new balance of change stored on magnetic stripe data card.

Figure 1:
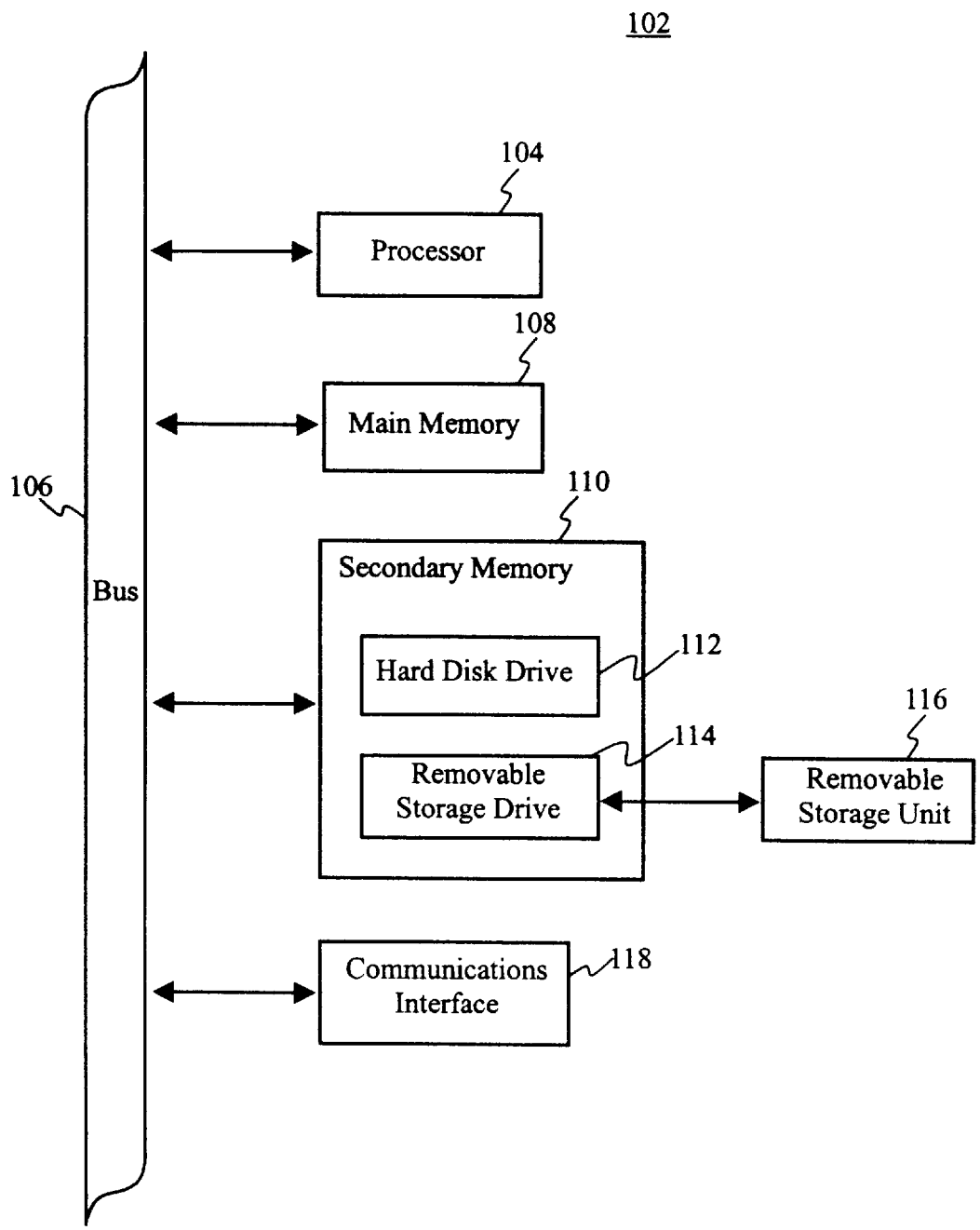
FIG. 1 is a block diagram showing an exemplary computer system useful for implementing the present invention.

Detailed Description of the Preferred Embodiments
A. Host System of a Preferred Environment for the Present Invention The chosen embodiment of the present invention includes computer software executing within a computer system. FIG. 1 shows an exemplary computer system. The computer system 102 includes one or more processors, such as a processor 104. The processor 104 is connected to a communication bus 106.

The computer system 102 also includes a main memory 108, preferably random access memory (RAM), and a secondary memory 110. The secondary memory 110 includes, for example, a hard disk drive 112 and/or a removable storage drive 114, representing a floppy disk drive, a magnetic tape drive, a compact disk drive, a program cartridge and cartridge interface (such as that found in video game devices), a removable memory chip (such as EPROM, or PROM), etc. which is read by and written to by a removable storage unit 116. The removable storage unit 116, also called a program storage device or a computer program product, represents a floppy disk, magnetic tape, compact disk, etc. As will be appreciated, the removable storage unit 116 includes a computer usable storage medium having stored therein computer software and/or data. The removable storage drive 114 reads from and/or writes to a removable storage unit 116 in a well known manner.

The computer system 102 may also include other similar means for allowing computer programs or other instructions to be loaded. Such means can include, for example, a communications interface 118. Communications interface 118 allows software and data to be transferred between computer system 102 and external devices. Examples of communications interface 118 can include a modem, a network interface (such as an Ethernet card), a communications port, etc. Software and data transferred via communications interface 118 are in the form of signals which can be electronic, electromagnetic, optical or other signals capable of being received by communications interface 118.

In this document, the term "computer program product" is used to generally refer to removable storage unit 116, a hard disk installed in hard disk drive 112, and signals transferred via communications interface 118. These computer program products are means for providing software to a computer system 102.

In an embodiment where the invention is implemented using software, the software may be stored in main memory 108, or in a computer program product and loaded into computer system 102 using removable storage drive 114, hard disk drive 112, or communications interface 118. The software, when executed by the processor 104, causes the processor 104 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The preferred embodiment of the present invention is directed to execute on a computer system 102 using a standard operating system and processor 104. Operating systems and processors 104 are well known in the relevant arts and are commercially available. The preferred embodiment of the present invention is implemented in software, and more specifically, is written in a standard programming language. The preferred embodiment is described in these terms for convenience purpose only. Other comparable computer systems 102, operating systems, and programming languages could alternatively be used. It would be readily apparent to one of ordinary skill in the relevant art to select and incorporate comparable computer systems 102, operating systems, and programming languages into the present invention.

B. Overview of a Coinless Transactional System

Figure 2:
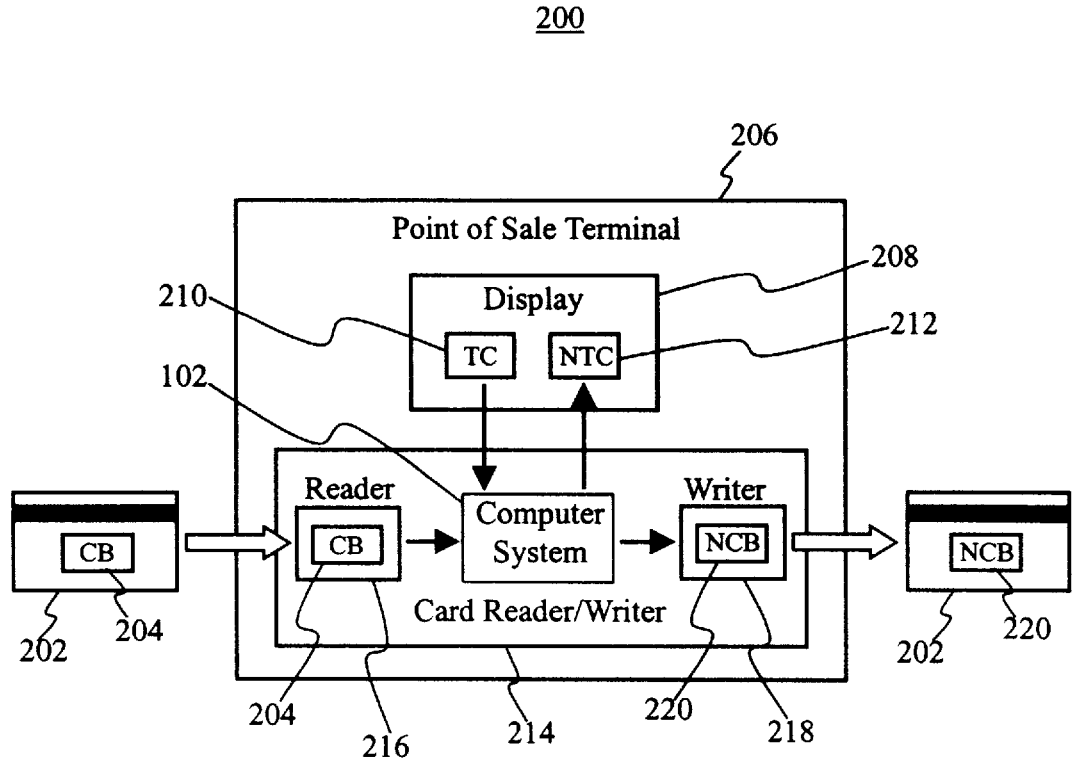
FIG. 2 is a functional schematic diagram illustrating the elements of a preferred embodiment of a coinless transaction system.

FIG. 2 is a functional schematic diagram illustrating the elements of a preferred embodiment of a coinless transaction system. In the preferred embodiment, the storage device used with the transaction system 200 of the present invention is a magnetic stripe data card 202. Magnetic stripe data cards 202 are well known in the relevant art, and are commonly used as credit cards, debit cards, and pre-valued vending cards, all of which store and transmit data needed for a commercial transaction. For convenience purpose only, the magnetic stripe data card 202 of the present invention will be referred to as a "change card" 202. Further, the present invention is described in terms of a change card 202 for convenience purpose only. It would be readily apparent to one of ordinary skill in the relevant art to use a comparable storage device.

The preferred embodiment of the present invention is also described in terms of United States currency for convenience purpose only. It would be readily apparent to one of ordinary skill in the relevant arts to develop and use a comparable coinless transaction system using the currency of another country.

In the transaction system 200 of the present invention, the change card 202 is used as a substitute for coins. More specifically, instead of carrying coins, a cardholder carries a change card 202 having a stored dollar value amount encoded on it. The cardholder conveniently uses the change card 202 for the purchase of goods and/or services in the place of coins such that the change card 202 is valued and devalued according to the transaction. The change card 202 is used with paper currency for the purchase of all types of goods and/or services in substantially the same way that coins with paper currency are used. Thus, for example, the change card 202 is used by a cardholder to purchase groceries from a supermarket, to purchase food or other items from a vending machine, to purchase food at a restaurant, to pay the fare for a bus ride or other transportation services, to pay tolls on a toll road, to pay for a telephone call, and the like. Further details of the physical structure of a change card 202 are not necessary for a complete understanding of the present invention and are not provided herein. Change cards 202 are well known in the relevant art. It would be readily apparent to one of ordinary skill in the relevant art to develop and use a change card 202 as described herein in a transaction system 200 of the present invention.

In the preferred embodiment, the change card 202 is magnetically encoded with fractional dollar values, ranging from $0.00 to $0.99, in the form of electronic change. The purchase of goods and/or services is accomplished by transferring a change value stored on the change card to and from a point of sale (POS) terminal 206. The POS terminal 206 is similar in structure and appearance to a standard electronic cash register, is preferably computer controlled, and has the capability of receiving and interfacing with the change card 202. The POS terminal 206 includes a card reader/writer device (hereinafter to be referred to as a "reader/writer") 214, and a display device 208, such as a cathode ray tube (CRT), or other commercially available display screen or monitor. The POS terminal 206 also includes an input means for entering and totaling the cost for the transaction such as a standard keyboard having both numeric and specialized keys typical of the type employed in an electronic cash register. The input means is not shown on FIG. 2 for convenience purpose only. It would be readily apparent to one of ordinary skill in the relevant art to incorporate an input means with the POS terminal 206 of the present invention as described herein.

In an alternate embodiment, the POS terminal 206 may also employ a fixed or hand-held scanner such as a bar code scanner of the type in use with many electronic cash registers for entering cost and other requisite information. Further, the POS terminal 206 may also include an openable drawer, such as a cash drawer or the like, which allows the POS terminal 12 to effectively handle transactions involving cash, checks, credit cards, or the like. Both the scanner and openable drawer are well known in the relevant art and are commercial available. It would be readily apparent to one of ordinary skill in the relevant art to adapt the present invention to accommodate a scanner and openable drawer or comparable equipment.

In operation, after the cost of the goods and/or services to be purchased by a cardholder has been entered into the POS terminal 206 and totaled, the POS terminal 206 displays a total cost for the transaction (TC) 210 on the display device 208 and transmits the cost information to the computer system 102. The computer system 102 receives and stores the TC 210. Next, the cardholder inserts a change card 202 into the reader/writer 214. The reader 216 reads a change balance (CB) 204 stored on the change card 202 and sends the CB 204 to the computer system 102. The computer system 102 automatically rounds the TC 210 up or down to the nearest whole dollar amount depending on the CB 204 stored on the change card 202. The rounding process results in a new fractionless cost for the transaction (NTC) 212 and is described in greater detail below. The NTC 212 is subsequently displayed on the display device 208. The cardholder pays the NTC 212 without the need to exchange coins. Meanwhile, the CB 204 stored on the cardholder's change card 202 is credited or debited accordingly, resulting in a new change balance for the transaction (NCB) 220 which is subsequently written back onto the change card 202. The reader/writer 214 holds the change card 202 in position until the transaction between the change card 202 and the POS terminal 206 is completed.

The hardware devices and information-processing means described above for receiving the change card 202 and for transferring the CB 204 from the change card 202 to the POS terminal 206 and the NCB 220 from the POS terminal 206 to the change card 202 are well known in the art. It would be readily apparent to one of ordinary skill in the relevant art to develop and integrate the described or comparable hardware devices and information-processing means.

The transaction system 200 comprising POS terminals 206 and change cards 202 described in the above examples, and in use in the present invention, may be employed in virtually any type of wholesale, retail, or other facility in which goods and/or services are purchased. In the preferred embodiment, a POS terminal 206 is located in the same place in which a cash register is located, at or near an entrance or exit to a facility, but, if desired, may be located within a particular area or department of a retail or other facility. It will be appreciated by those skilled in the art that while only one specific type of POS terminal 206, an electronic cash register, is discussed as a preferred embodiment for the present invention, many different types of POS terminals 206 may be employed for receiving and transferring value from a change card 202. For example, an alternate embodiment is a vending machine apparatus equipped with a bill validator which is adapted to receive, read, and verify currency for use in conducting coinless transactions. It will be appreciated that the POS terminal 206 employed in the present invention may take on several forms, and therefore, the particular embodiment of the POS terminal 206 discussed herein should not be considered to be a limitation on the scope of the present invention. It would be readily apparent to one of ordinary skill in the relevant art to construct and use a comparable POS terminal 206 and change card 202.

C. Operation of the Coinless Transactional System

Figure 3:
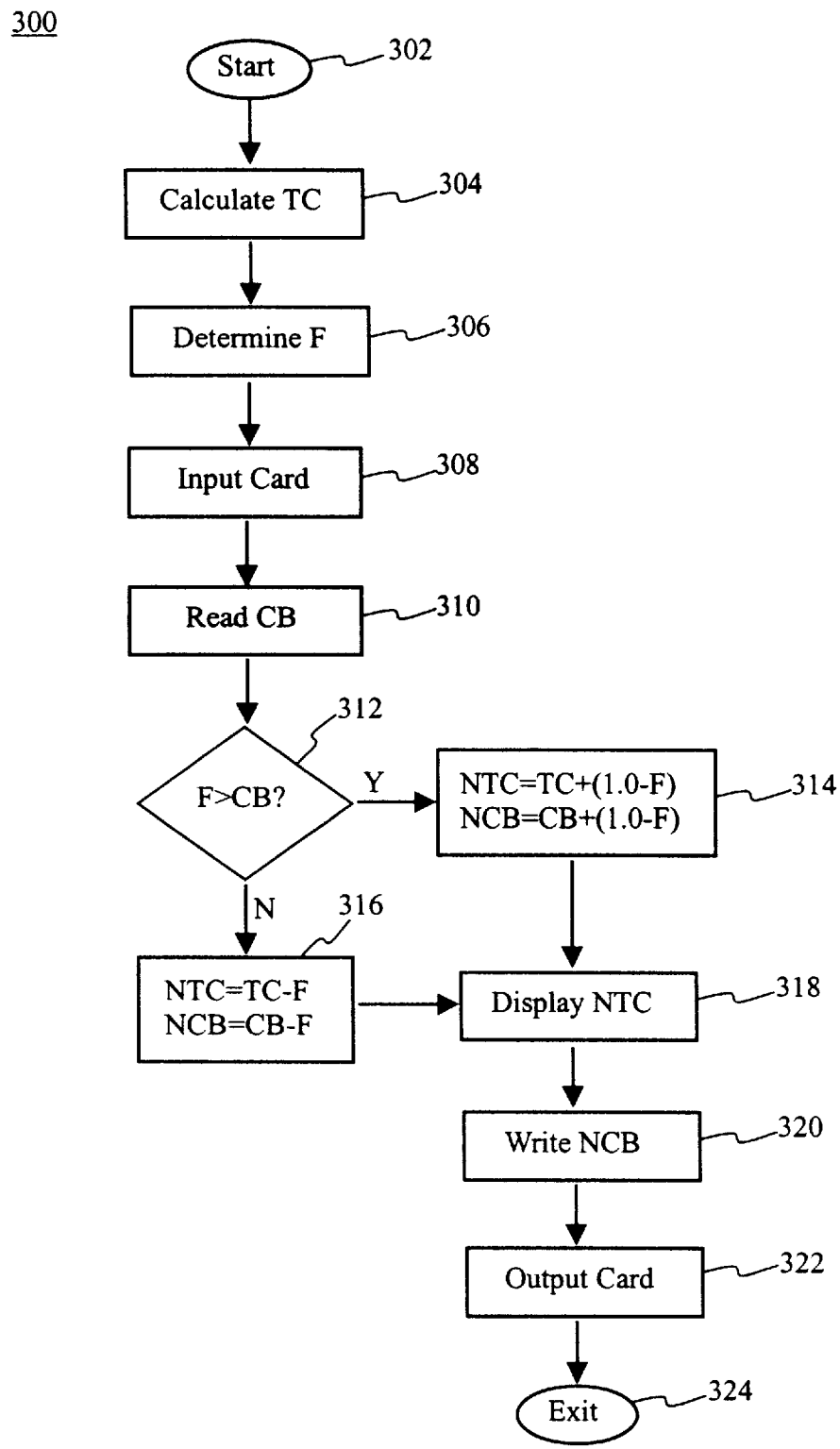
FIG. 3 is an operational flow diagram illustrating the processing of a coinless transaction.

FIG. 3 is an operational flow diagram illustrating the processing of a coinless transaction within a transaction system 200 of the present invention. As one possible embodiment of the present invention, a commercial transaction takes place between a customer and a salesperson with an electronic cash register as a POS terminal 206. The operation of a coinless transaction is described in these terms for convenience purpose only. It would be readily apparent to one of ordinary skill in the relevant art to use the transaction system 200 of the present invention in other comparable transactions, e.g., a purchase from a vending machine.

In operation, processing begins at step 302 and immediately proceeds to step 304. In step 304, the salesperson calculates the total dollar cost (TC) 210 of the goods and/or services that are purchased by the customer. The salesperson also enters the TC 210 into the POS terminal 206. More specifically, the computer system 102 of the POS terminal 206 receives the TC 210 and processing continues to step 306.

In step 306, the computer system 102 determines a fractional value (F) of the TC 210. F is that amount of a TC 210 that is not a whole dollar and remains after all of the whole dollars are removed, e.g., the number of cents. In the preferred embodiment, F is always between $0.00 and $0.99. For example, when the TC 210 is $34.27, F equals 27, and when the TC 210 is $0.86, F equals 86.

Proceeding to step 308, the salesperson or cardholder inserts the change card 202 into the reader/writer 214 of the POS terminal 206. Processing then continues to step 310. In step 310, the reader 216 of the reader/writer 214 reads the change balance (CB) 204 stored on the change card 202 and sends the CB 204 to the computer system 102. After step 310, the POS terminal 206 continues to step 312.

In step 312, the computer system 102 compares the CB 204 with F to determine whether or not F is greater than CB 204. If the computer system 102 determines that F is greater than the CB 204, the computer system 102 proceeds to step 314 wherein the TC 210 is rounded up to the next whole dollar amount by a renewal amount because the CB 204 on the change card 202 is not enough to cover the F of the TC 210. More specifically, in step 314, the computer system 102 calculates a renewal amount equal to a value of 1.0 minus F. The renewal amount is then added to the TC 210, thereby generating a new fractionless cost for the transaction (NTC) 212. Therefore, in step 314, the computer system 102 automatically increases the CB 204 on the change card 202 and the TC 210 by a renewal amount equal to the difference between the TC 210 and the next highest whole dollar amount. The renewal amount is also added to the CB 204, thereby generating a new change balance for the transaction (NCB) 220. After calculating the NTC 212 and NCB 220, the computer system proceeds to step 318. Step 318 is described below.

Returning again to step 312, if the computer system 102 determines that F is not greater than the CB 204, the computer system 102 proceeds to step 316. In step 316, the computer system 102 rounds the TC 210 down to the next whole dollar amount because the CB 204 on the change card 202 is large enough to cover the F of the TC 210. More specifically, in step 316, the computer system 102 calculates a depletion amount equal to F. The depletion amount is then subtracted from the TC 210, thereby generating a NTC 212. The depletion amount is then subtracted from the CB 204, thereby generating a NCB 220. Therefore, in step 316, the computer system 102 automatically decreases the CB 204 on the change card 202 and the TC 210 by a depletion amount equal to the difference between the TC 210 and the next lowest whole dollar amount which is F. After calculating the NTC 212 and NCB 220, the computer system proceeds to step 318.

In step 318, the computer system, displays the NTC 212 on the display device 208, thereby informing the cardholder of the whole dollar amount that he must pay without the need for giving or receiving change. Continuing to step 320, the computer system 102 sends the NCB 220 to the writer 218 which writes the NCB 220 back onto the change card 202. The writer 218 continues to step 322 and outputs the change card 202 to the cardholder. The cardholder removes the change card 202 from the POS terminal 206 for subsequent purchases. Processing proceeds to step 324 and exits.

Therefore, the above described system and method of the present invention may be used to purchase goods and/or services without using coins by eliminating the fractional cost (F) from the total cost of the transaction (TC).

According to the preferred embodiment of the present invention for conducting coinless transactions, the CB 204 stored on a change card 202 never exceeds 99 cents ($0.99). A larger amount is not preferable because it creates significant liabilities arising from fraudulent uses involving lost or stolen cards. By allowing the CB 204 stored on a change card 202 to fluctuate within a range sufficient enough to cover the fractional dollar cost of any TC 210, this invention effectively controls and contains such liabilities.

In the preferred embodiment, the present invention also eliminates the need to physically carry fractional dollar valued coins such as quarters, nickels, dimes, pennies, etc. An alternative embodiment, however, may eliminate, for example, only pennies. This requires that the effective CB 204 stored on a change card 202 be allowed to fluctuate within a range sufficient enough to cover the fractional nickel cost of any TC 210, that is, zero to four cents ($0.00≦CB≦$0.04). Therefore, depending on the CB 204 stored on a change card 202, the POS terminal 206 can be programmed to automatically adjust a TC 210 up or down to the nearest whole (fractionless) dollar, or if desired, whole quarter, dime, or nickel, amount. This obviates the need to physically carry coins of any desired denomination in order to conduct cash-payment transactions.

Conclusion

Accordingly, the reader will see that the system of the present invention can be used to easily and conveniently conduct commercial transactions without using coins. This is an open system which may be employed in virtually any type of retail environment, and which does not require banks and other financial institutions to mediate the transaction. The present invention is superior to the use of change in that the transfer of value from a change card for the purchase of goods and/or services occurs in an automated manner during the transaction. This eliminates the need to produce, transport, store, or secure coins at the point of sale. This also obviates the need for a cardholder to load value onto the card in the form of cash or credit at a separate terminal. With the transaction system of the present invention, the change card is more cost-effective to use than coins, and all transactions occur in a secure and self-validating manner.

For purposes of describing the present invention, the functional aspects of a preferred embodiment are illustrated, but many other variations are possible in which the same or essentially the same structural and operational elements are present. For example, automated point of sale terminals, such as vending machines equipped with bill validators and means with which a change card interfaces for the transfer of monetary value in order to effect a purchase, may be employed in substantially the same manner described above to conduct coinless transactions. Therefore, depending on whether the balance of change stored on the card is sufficient to cover the expense of an item a cardholder desires to purchase from the vending machine, the cardholder will or will not insert an additional dollar bill into the bill validator. The cost of the item is then automatically deducted from the total available balance, and the remaining change resulting from the transaction, which preferably does not exceed $0.99, is written back onto the card.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method for conducting a coinless transaction using a specified currency, comprising the steps of:

(a) calculating a total cost for goods and services of a commercial transaction;

(b) determining a fractional cost of said total cost;

(c) reading a change balance on a storage device;

(d) comparing said fractional cost with said change balance;

(e) determining whether said fractional cost is greater than said change balance;

(f) increasing said total cost by a renewal amount to a next whole number, thereby calculating a new total cost, if it is determined in step (e) that said fractional cost is greater than said change balance;

(g) increasing said change balance by said renewal amount, thereby calculating a new change balance, if it is determined in step (e) that said fractional cost is greater than said change balance;

(h) decreasing said total cost by a depletion amount to a whole number, thereby calculating a new total cost, if it is determined in step (e) that said fractional cost is less than or equal to said change balance;

(i) decreasing said change balance by said depletion amount, thereby calculating a new change balance, if it is determined in step (e) that said fractional cost is less than or equal to said change balance;

(j) displaying said new total cost; and (k) writing said new change balance onto said storage device.

2. The method of claim 1, further comprising the step of:

(l) displaying said new change balance.

3. The method of claim 1, wherein said storage device is a magnetic stripe data card.

4. The method of claim 3, further comprising the following steps:

(k) inputting said magnetic stripe data card; and (l) outputting said magnetic stripe data card.

5. The method of claim 1, wherein said renewal amount is equal to 1.0 minus said fractional cost and said depletion amount is equal to said fractional cost.

6. The method of claim 1, wherein said fractional cost is in a range of zero to a coin value of said specified currency minus a smallest denomination of said specified currency.

7. The method of claim 6, wherein said specified currency is United States currency, said coin value is a dollar, half-dollar, quarter, dime, or nickel, and said smallest denomination is a penny.

8. A point of sale terminal for conducting a coinless transaction using a specified currency, comprising:

a means for receiving a total cost for goods and services of a commercial transaction;

a means for receiving a change balance stored on a storage device;

a means for calculating a new total cost and a new change balance, wherein said new total cost is a whole number; and a means for outputting said new total cost and said new change balance.

9. The point of sale terminal of claim 8, further comprising:

a reader for receiving said storage device having said change balance stored on said storage device and for reading said change balance; and a writer for receiving said new change balance and writing said new change balance onto said storage device.

10. The point of sale terminal of claim 8, further comprising:

a display for displaying said new total cost and said new change balance.

11. The point of sale terminal of claim 8, wherein said storage device is a magnetic stripe data card.

12. The point of sale terminal of claim 8, wherein for said means for calculating a new total cost and a new change balance, said computer system determines a fractional cost of said total cost, compares said fractional cost with said change balance, determines whether said fractional cost is greater than said change balance, increases said total cost by a renewal amount thereby calculating a new total cost if said fractional cost is greater than said change balance, increasing said change balance by said renewal amount thereby calculating said new change balance if said fractional cost is greater than said change balance, decreasing said total cost by a depletion amount thereby calculating said new total cost if said fractional cost is less than or equal to said change balance, and decreasing said change balance by said depletion amount thereby calculating said new change balance if said fractional cost is less than or equal to said change balance.

13. The point of sale terminal of claim 12, wherein said renewal amount is equal to 1.0 minus said fractional cost and said depletion amount is equal to said fractional cost.

14. The point of sale terminal of claim 12, wherein said fractional cost is in a range of zero to a coin value of said specified currency minus a smallest denomination of said specified currency.

15. The point of sale terminal of claim 14, wherein said specified currency is United States currency, said coin value is a dollar, half-dollar, quarter, dime, or nickel, and said smallest denomination is a penny.

16. The point of sale terminal of claim 8, wherein said means for receiving a total cost is a keyboard.

17. The point of sale terminal of claim 8, wherein said means for receiving a total cost is a bar code scanner.

18. The point of sale terminal of claim 8, further comprising an openable drawer.

19. A computer program product for use with a computer system, comprising:

a computer usable medium having computer readable program code means embodied in said medium for conducting a coinless transaction using a specified currency, wherein a point of sale terminal receives a total cost for goods and services of a commercial transaction and reads a change balance on a storage device, said computer program product having:

first computer readable program code means for receiving the total cost of the commercial transaction;

second computer readable program code means for receiving the change balance stored on the storage device;

third computer readable program code means for determining a fractional cost of the total cost;

fourth computer readable program code means for comparing said fractional cost with the change balance;

fifth computer readable program code means for determining whether said fractional cost is greater than the change balance; and sixth computer readable program code means for calculating a new total cost and a new change balance, wherein said new total cost is a whole number, wherein the point of sale terminal writes said new change balance on the storage device.

20. The computer program product of claim 19, wherein said sixth computer readable program code means increases the total cost by a renewal amount thereby calculating a new total cost if said fractional cost is greater than the change balance, increases said change balance by said renewal amount thereby calculating said new change balance if said fractional cost is greater than said change balance, decreases said total cost by a depletion amount thereby calculating said new total cost if said fractional cost is less than or equal to said change balance, and decreases said change balance by said depletion amount thereby calculating said new change balance if said fractional cost is less than or equal to said change balance.

21. The computer program product of claim 20, wherein said renewal amount equals 1.0 minus said fractional cost and said depletion amount equals said fractional cost.

22. The computer program product of claim 20, wherein said fractional cost is in a range of zero to a coin value of said specified currency minus a smallest denomination of said specified currency.

23. The computer program product of claim 22, wherein said specified currency is United States currency, said coin value is a dollar, half-dollar, quarter, dime, or nickel, and said smallest denomination is a penny.

* * * * *